F. L. WELLMAN.
HOOF SPREADER.
APPLICATION FILED MAY 11, 1917.
1,267,151.
Patented May 21, 1918.
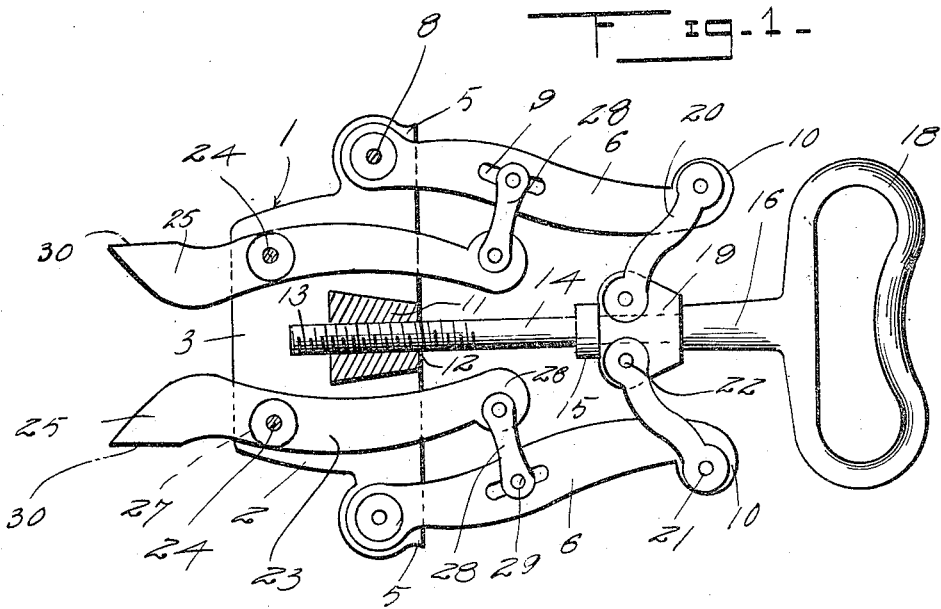
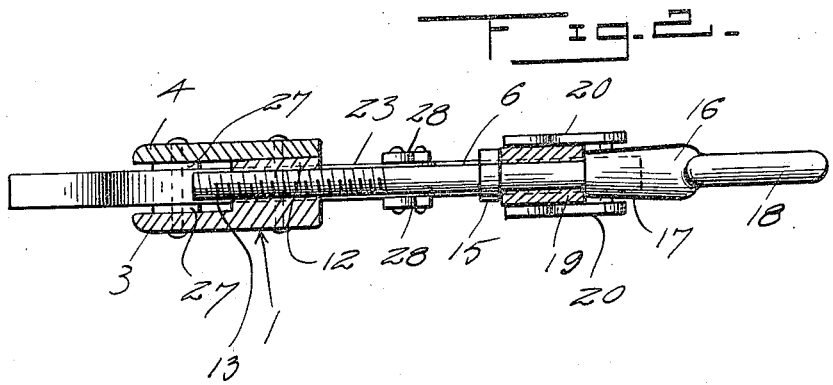
Witnesses
C. R. Beall.
Jesse T. Dowling
Inventor
F. L. Wellman
By
Attorney

UNITED STATES PATENT OFFICE.

FREDERICK L. WELLMAN, OF WALPOLE, NEW HAMPSHIRE.

HOOF-SPREADER.

1,267,151.  Specification of Letters Patent.  Patented May 21, 1918.

Application filed May 11, 1917. Serial No. 167,963.

*To all whom it may concern:*

Be it known that I, FREDERICK L. WELLMAN, a citizen of the United States, residing at Walpole, in the county of Cheshire and State of New Hampshire, have invented certain new and useful Improvements in Hoof-Spreaders; and I do hereby declare the following to be a full, clear, and exact description of the invention, such as will enable others skilled in the art to which it appertains to make and use the same.

This invention relates to improvements in hoof spreaders.

The object of this invention is to provide a spreader, which is so constructed as to spread the hoofs of horses, mules or the like, thus preventing the animals from going lame, which is caused by having pinched feet.

A further novelty of this invention is to provide a tool capable of spreading the hoofs of horses, mules or the like after the shoe has been rigidly secured to the hoof, thus the shoe is spread simultaneously with the hoof, and as the shoe remains spread, it will hold the animal's hoof spread also.

A still further object of this invention is to provide a tool, having pivoted jaws, which are adapted to be engaged against the opposing faces of the calks of a shoe, and by turning the threaded shank, the jaws will be spread, urging the shoe apart, thus causing the hoof to spread also.

A still further object of this invention is to provide a tool of this character, which will be simple, practical and comparatively inexpensive in construction, and one that can be manufactured and sold at a low cost.

With these and other objects in view, the invention consists in the novel combination and arrangement of parts hereinafter more fully described and set forth in the claims hereto appended.

In the drawings:

Figure 1 is a top plan view of the device, with one portion of the housing removed to illustrate the manner in which the tool is constructed; and Fig. 2 is a longitudinal sectional view of the same.

Like numerals of reference designate corresponding parts in all the figures of the drawings.

Referring to the drawings, the numeral 1 designates the tool in its entirety, and it is constructed of suitable metal or other material, suitable for the purpose. The hoof spreading tool comprises a housing 2, which is constructed of a pair of spaced plates 3 and 4, which plates are tapered and have the ends of their rear longitudinal edges extended as at 5 for the purpose of pivotally receiving the levers 6. The levers 6 have one of their ends pivoted as at 8 between the opposing faces of the plates 3 and 4 to the extensions 5 thereof.

The levers 6 are provided intermediate their ends with longitudinally extending slots 9 and their opposite ends terminate in circular apertured enlargements 10, the purpose of which will be hereinafter more fully described.

A bearing 11 is formed integrally with the opposing faces of the plates 3 and 4 centrally thereof and has one end flush with their rear longitudinal edges. The bearing 11 has a screw-threaded longitudinally extending bore 12, which is adapted to receive the screw-threads 13 formed on the longitudinally extending shank 14. The shank 14 is provided toward its outer end with a stop collar 15, which is formed integrally therewith and is adapted to coöperate with the inner end of the socket 16, which is fitted and fixed upon the end of the shank 14 as at 17. The outer end of the socket 16 has formed thereon the handle 18, which facilitates the rotating of the shank 14 into and out from the bearing 11, the purpose of which will be hereinafter more fully described.

A spreading collar 19 is loosely mounted on the shank 14 and abuts the stop collar 15 and the inner end of the socket 16, thus being prevented from longitudinal movement on the shank 14, but being freely rotatable thereon to permit the shank to be rotated therein, while threaded in the bearing 11.

A plurality of links 20 are arranged in pairs and each pair is pivotally secured as at 21 to the apertured collars 10 or circular ends of the levers 6, and they have their free ends pivotally secured as at 22 to the spreading collar 19 as shown in Fig. 1.

A pair of jaws 23 are pivotally secured as at 24 between the opposing faces of the plates 3 and 4 and on opposite sides of the bearing 11. The jaws 23 comprise the arcuate bodies, which bodies have one end curved outwardly as at 25 to provide the shoe-engaging members, while the opposite ends terminate in the circular apertured enlargements 26, and the bodies of the jaws are provided adjacent their working ends 25 with the circular apertured enlargements 27, which extend above and below the surface of the opposite side faces of the jaws 23, thus forming bearing collars to facilitate the journaling of them between the opposing faces of the plates 3 and 4 adjacent the forward longitudinal edges thereof. The ends 26 of the jaws extend rearwardly beyond the rear longitudinal edges of the plates 3 and 4 and have pivotally secured thereto, pairs of links 28, and the free ends of the links are pivotally secured in the slots 9 of the levers 6 as at 29, thereby upon movement of the shank 14 in the bearing 11, the jaws will be controlled in their movement through the spreading collar 19, bars 6 and links 20 and 28.

In operation, the hoof spreader is to be used in connection with the hoofs of various animals, such as horses and the like, and is adapted to be used after the shoe has been permanently or rigidly secured to the hoof. The flat faces of the working ends of the jaws 23, designated 30 in the drawings, are placed in engagement with the opposing faces of the heel calks of the shoe and to compensate for the placing of the flat faces in engagement with the calks of the heel of a shoe, the handle 18 of the shank 14 is turned in a counterclockwise direction, thus moving the spreading collar 19 away from the bearing 11, which moves the levers 6 outwardly through the medium of the links 20, thus through the medium of the links 28, which moves the ends 26 of the jaws outwardly and brings the ends 25 of the jaws into closer relation with one another, thereby permitting the flat faces 30 to readily engage the opposing faces of the calks of a shoe.

The handle 18 is then rotated or turned in a clockwise direction, thus moving the spreading collar 19 in the direction of the bearing 11, which draws the links 20 in the direction of the bearing 11 also, moving the ends 10 of the levers 6 inwardly, thus through the medium of the links 28 and slots 9 in the bars the ends 26 of the jaws will be moved toward the shank 14, thus spreading the ends 25, urging the heel calks of the horseshoe away from one another simultaneously spreading the hoof. It is understood that the hoof should not be spread more than about an eighth of an inch at a time, and the operation should be repeated about three or four times a week, thereby preventing the hoof from crowding or pinching and causing the animal to go lame.

What is claimed is:

1. A hoof spreader comprising a housing, a threaded bearing located in the housing, jaws pivotally secured in the housing on opposite sides of the bearing, bars pivotally secured to the housing, a shank threaded in the bearing, means pivotally secured to the shank and the bars, and means pivotally secured to the jaws and bars for movement of the jaws upon movement of the shank in the bearing.

2. A hoof spreader comprising a housing, a threaded bearing in the housing, jaws pivotally secured in the housing on opposite sides of the bearing, bars pivotally secured to the housing on opposite sides of the bearing, a shank threaded in the bearing, a handle on one end of the shank, a spreading collar rotatably mounted on the shank, means pivotally securing the spreading collar to the bars, and means pivotally secured to the bars and to the jaws for moving the jaws to and away from one another upon movement of the shank in the bearing.

3. A hoof spreader comprising a housing, a threaded bearing secured in the housing centrally thereof, jaws pivotally secured in the housing on opposite sides of the bearing, said jaws extending beyond the forward and rear edges of the housing, bars pivotally secured to the housing at the rear end thereof and on opposite sides of the bearing and jaws, a shank screw-threadedly mounted in the bearing, a handle on the outer end of the shank, a spreading collar rotatably mounted on the handle, means for holding the collar against longitudinal movement thereon, means pivotally connecting the spreading collar with the bars, and means pivotally securing the jaws to the bars, said means permitting the jaws to be moved to and away from one another upon movement of the shank into and out of the bearing.

4. A hoof spreader comprising a pair of spaced plates constituting a housing, a threaded bearing secured to the opposite faces of the plates centrally thereof adjacent the rear edge thereof, jaws pivotally mounted between the opposing faces of the plates and extending beyond the forward and rear edges thereof, said jaws located on opposite sides of the bearing, a pair of bars having one end pivotally secured between the opposing faces of the plates at the rear edge thereof and located on opposite sides of the bearing, a shank screw-threadedly mounted in the bearing, a stop collar carried intermediate the ends of the shank, a handle rigidly secured to the free end of the shank, a spreading collar rotatably mounted on the shank and located between the inner end of the handle and stop collar to limit the longitudinal movement of the same on the shank, links pivotally securing the free ends of the bars with the spreading collar, and links pivotally secured to the bars and free ends of the jaws for movement of the jaws upon movement of the shank in the bearing.

In testimony whereof I affix my signature in presence of two witnesses.

FREDERICK L. WELLMAN.

Witnesses:
 IDA L. HOWARD,
 WM. J. HALL.

Copies of this patent may be obtained for five cents each, by addressing the "Commissioner of Patents. Washington, D. C."